United States Patent
Fabian et al.

(10) Patent No.: US 10,359,579 B2
(45) Date of Patent: Jul. 23, 2019

(54) MULTI-FERRULE CONNECTOR

(71) Applicant: TE CONNECTIVITY CORPORATION, Berwyn, PA (US)

(72) Inventors: David James Fabian, Mount Joy, PA (US); James Patrick Mosier, Palmyra, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 92 days.

(21) Appl. No.: 15/487,042

(22) Filed: Apr. 13, 2017

(65) Prior Publication Data
US 2018/0299625 A1    Oct. 18, 2018

(51) Int. Cl.
*G02B 6/38* (2006.01)
*G02B 6/42* (2006.01)

(52) U.S. Cl.
CPC .......... *G02B 6/3878* (2013.01); *G02B 6/383* (2013.01); *G02B 6/3885* (2013.01); *G02B 6/4256* (2013.01); *G02B 6/3897* (2013.01)

(58) Field of Classification Search
CPC .... G02B 6/383; G02B 6/3878; G02B 6/3885; G02B 6/3897; G02B 6/4256
See application file for complete search history.

(56) References Cited

U.S. PATENT DOCUMENTS

| | | | | |
|---|---|---|---|---|
| 4,875,755 A | | 10/1989 | Borgos et al. | |
| 6,259,856 B1 * | | 7/2001 | Shahid | G02B 6/3879 385/147 |
| 6,302,591 B1 * | | 10/2001 | Nagaoka | G02B 6/3869 385/59 |
| 6,513,989 B1 * | | 2/2003 | Bleck | G02B 6/3879 385/60 |
| 7,318,677 B2 * | | 1/2008 | Dye | G02B 6/3821 385/53 |
| 8,403,570 B2 * | | 3/2013 | Fisher | G02B 6/3878 385/70 |
| 9,207,454 B1 * | | 12/2015 | Bakhmutsky | G02B 6/4452 |
| 9,354,399 B2 * | | 5/2016 | Waldron | G02B 6/38 |
| 2009/0103877 A1 | | 4/2009 | Kluwe et al. | |
| 2009/0257722 A1 | | 10/2009 | Fisher et al. | |
| 2014/0044395 A1 | | 2/2014 | Waldron et al. | |
| 2018/0164513 A1 * | | 6/2018 | Fabian | G02B 6/3874 |

FOREIGN PATENT DOCUMENTS

| | | |
|---|---|---|
| DE | 31 29 489 A1 | 2/1983 |
| EP | 2 637 049 A2 | 9/2013 |

OTHER PUBLICATIONS

International Search Report, Application No. PCT/IP2018/052589, International Filing Date, Apr. 13, 2018.

* cited by examiner

*Primary Examiner* — Daniel Petkovsek

(57) ABSTRACT

A connector comprising: (a) a housing defining a plurality of openings, a portion of the openings being peripheral openings and at least one of the openings being an interior opening; and (b) at least two retainer components defining a plurality of retainer openings which align with the plurality of openings, each of the retainer components defining a periphery and a portion of the plurality of retainer openings, and being configured with an accessway from the periphery to each of the portion of the plurality of retainer openings to allow passage of a cable therethrough.

15 Claims, 3 Drawing Sheets

MULTI-FERRULE CONNECTOR

FIELD OF INVENTION

The present invention relates, generally, to optical connectors and, more specifically, to multi-ferrule connectors.

BACKGROUND

A common optical connector is a multi-ferrule connector. Multi-ferrule connectors are used, for example, in a variety of applications. In particular, in the VMEbus International Trade Association (VITA) 66.1 Fiber-Optic Connectors for use with MT Ferrules system, the ability to achieve a high bandwidth connection utilizing a large number of ferrules in parallel is constrained due to the physical structure of components in the system. This connector system has been designed for use as independent or stand-alone connectors in ANSI/VITA 48.1 (air-cooling applications) and ANSI/VITA 48.2 (conduction-cooling applications) applied to printed wiring boards (PWBs)/plug-in units defined in ANSI/VITA 46.0 VPX systems. Typical applications are in the aerospace and defense industry and include use in adverse environments for Embedded Computing, Processing, Avionics and Vetronics, Radar, Secure Communications and Imaging/Targeting.

Generally, a multi-ferrule connector comprises a housing having a plurality of openings for receiving a plurality of ferrule assemblies. A ferrule assembly comprises a ferrule terminated with fibers, which extend rearwardly from the ferrule. The length of the fibers extending from the ferrule can vary from just a few inches to many yards. A multi-fiber connector also comprises a ferrule retainer behind the ferrules for preventing the ferrules from being pushed/pulled rearwardly and out of the openings in the housing. In other words, the ferrule retainer functions as a backstop for the ferrules. Generally, a ferrule retainer is a plate-like structure comprising a number of openings to accommodate the ferrule assembly fibers. The ferrule retainer also comprises accessways along the periphery of the retainer to each of the openings such that the fibers of each ferrule assembly can be slid through the accessway and into the opening from the side of the retainer as opposed to be threaded through the openings, which can be problematic for long lengths of fibers. Furthermore, after the distal end of the ferrule assembly fibers are spliced or otherwise terminated, it is impossible to thread them through the openings. See, for example, U.S. Pat. No. 9,507,098. Therefore, for all intents and purposes, to be commercially viable, the ferrule retainer must have accessways from its periphery to each of the ferrule retainer openings to accommodate installing the ferrule assembly fibers prior to assembling the ferrule retainer to the housing.

Applicants recognize that this conventional design tends to limit the configuration of multi-ferrule connectors. Specifically, the conventional design can only accommodate multi-ferrule connectors in which each ferrule retainer opening is along the periphery of the ferrule retainer to have access to the periphery of the retainer. In other words, the conventional design cannot accommodate a ferrule retainer with interior openings. As used herein, an interior opening in an opening in the housing or ferrule retainer that is not adjacent the periphery of a housing or ferrule retainer. For example, a multi-ferrule configuration having a 3×3 matrix (i.e., three rows and three columns) of ferrules defines one interior opening. Applicants recognize that the conventional design does not permit multi-ferrule configurations having one or more interior ferrules because providing access from the periphery of the ferrule retainer to the interior opening is difficult, if not impossible.

Accordingly, Applicants recognize the need for an improved design to increase the number of ferrules that a multi-ferrule connector can accommodate. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, the invention relates to a multi-ferrule connector comprising: (a) a housing defining a plurality of ferrule openings, a portion of the ferrule openings being peripheral openings and at least one of the ferrule openings being an interior opening; and (b) at least two ferrule retainer components defining a plurality of ferrule retainer openings which align with the plurality of ferrule openings, each of the ferrule retainer components defining a periphery and a portion of the plurality of ferrule retainer openings, and being configured with an accessway from the periphery to each of the portion of the plurality of ferrule retainer openings to allow passage of a cable therethrough.

In another embodiment, the connector comprises: (a) a housing defining a plurality of ferrule openings; and (b) a ferrule retainer comprising at least two ferrule retainer components, the ferrule retainer having an unassembled state in which the at least two ferrule retainer components are separate, and an assembled state in which the at least two ferrule retainer components are combined; wherein, in the assembled state, the ferrule retainer defines a periphery and a plurality of ferrule retainer openings at least one of which is an interior opening with no accessway to the periphery of the ferrule retainer, the ferrule retainer being configured to be combined with the housing such that the plurality of ferrule retainer openings aligns with the plurality of ferrule openings; wherein, in the unassembled state, each of the ferrule retainer components defines a periphery and a portion of the plurality of ferrule retainer openings, at least one of the ferrule retainer components defining an accessway to the interior opening to allow passage of a ferrule assembly's fibers therethrough.

In yet another embodiment, the invention relates to a connector kit comprising (a) a housing defining a plurality of openings for receiving an interface portion of one or more conductors; and (b) at least two retainer components defining a plurality of retainer openings and being configured to be combined with the housing such that the plurality of retainer openings aligns with the plurality of openings, each of the retainer components defining a periphery and a portion of the plurality of retainer openings, the each retainer being configured to provide access from the periphery to each opening of the portion of the plurality of retainer openings to allow passage of a cable therethrough.

DETAILED DESCRIPTION

Figure 1:
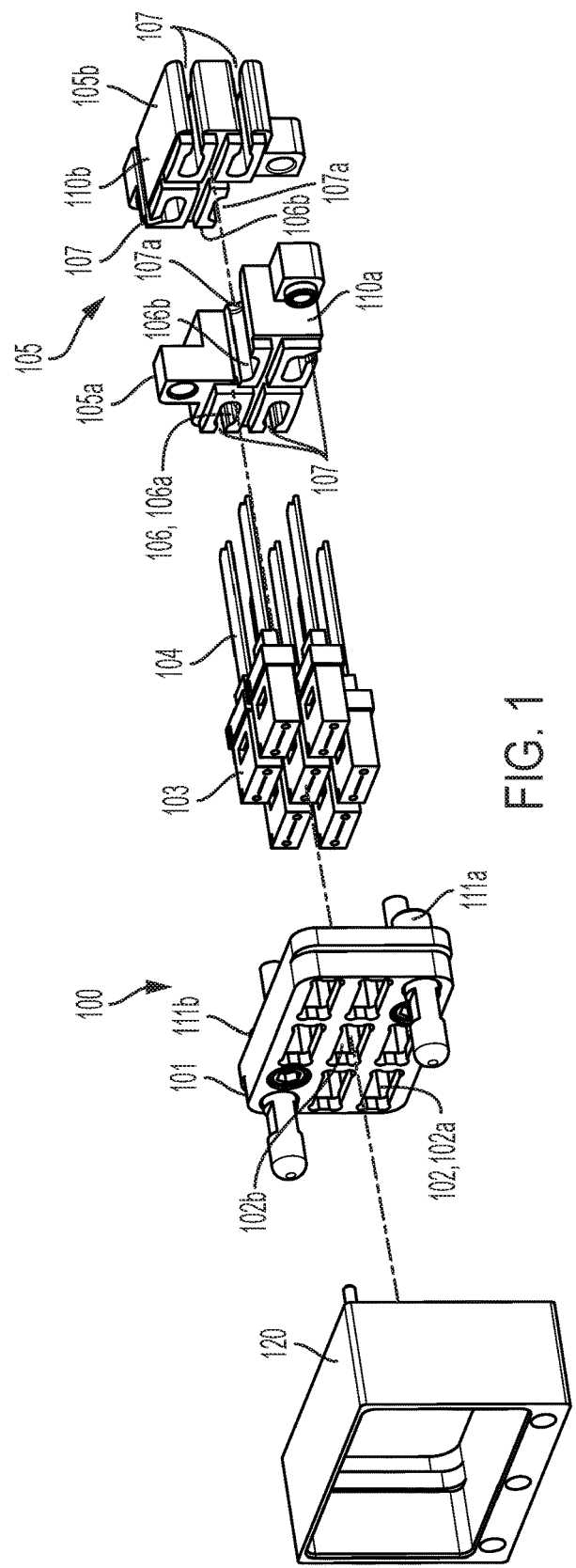
FIG. 1 shows an exploded view of one embodiment of the connector of the present invention.
Figure 2:
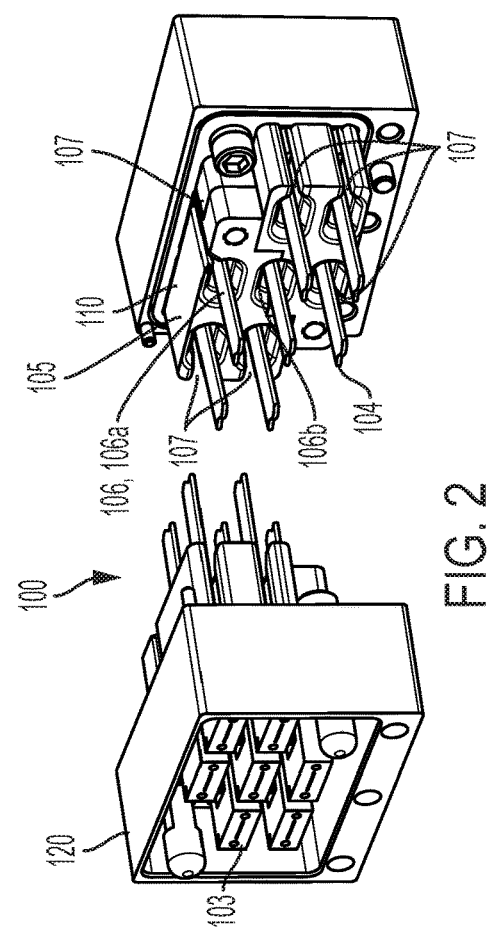
FIG. 2 shows front and rear perspective views of the connector of FIG. 1 in its assembled state.
Figure 3:
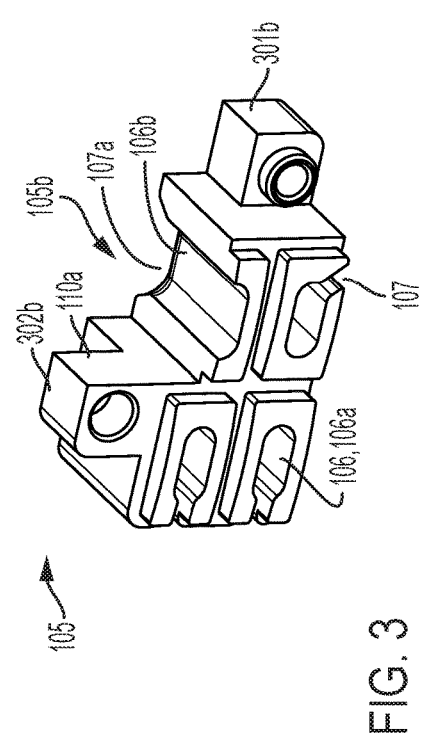
FIG. 3 shows the ferrule retainer portions of the connector of FIG. 1 in their unassembled state.
Figure 3:
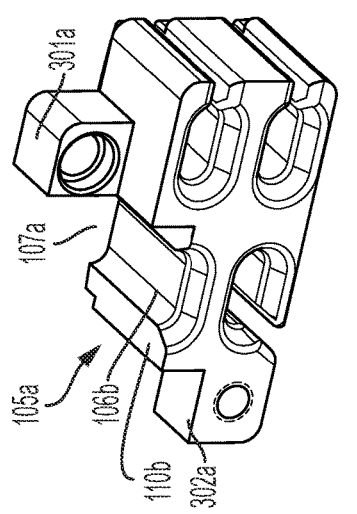

Referring to FIGS. 1-3, one embodiment of a connector 100 of the present invention is shown. The connector comprises a housing 101 defining a plurality of ferrule openings 102 for receiving ferrule assemblies 103, and a ferrule retainer 105 comprising at least two ferrule retainer components 105a, 105b. The ferrule retainer 105 has an unassembled state in which the at least two ferrule retainer components are separate, and an assembled state in which the at least two ferrule retainer components are combined. In the assembled state (see FIG. 2), the ferrule retainer defines a periphery 110 and a plurality of ferrule retainer openings 106 at least one of which is an interior opening 106b having no accessway to the periphery of the ferrule retainer. In its assembled state, the ferrule retainer is configured to be combined with the housing such that the plurality of ferrule retainer openings 106 aligns with the plurality of ferrule openings 102. In the unassembled state, each of the ferrule retainer components 105a, 105b defines a periphery 110a, 110b, respectively, and a portion of the plurality of ferrule retainer openings 106. At least one of the ferrule retainer components defines an accessway 107a to the interior opening 106b to allow passage of a ferrule assembly's fibers 104 therethrough. These elements are described in greater detail below.

The ferrule assemblies 103 are, in one embodiment, conventional/standard configurations and, thus, will not be described herein in detail. It should be understood, however, that the invention is not limited to a connector having traditional ferrule assemblies, but the retainer configuration disclosed herein could be applied to retain electrical contacts and optical inserts or a combination thereof instead of traditional ferrule assemblies. Indeed, the present invention is applicable to any application in which multiple conductors of light and/or electricity needs to be held in a precise position.

Of particular interest herein, is the housing 101 and ferrule retainer 105. Like a conventional housing, housing 101 defines a number of ferrule openings 102 to receive a ferrule assembly 103. Unlike a conventional housing, housing 101 defines at least one interior ferule opening 102b in addition to a number of periphery ferrule openings 102a.

The ferrule retainer 105 is depicted in its unassembled state in FIG. 1, and in its assembled state in FIG. 2. As with a conventional ferrule retainer, ferrule retainer 105 in its assembled state defines a number of periphery ferrule retainer openings 106a, and accessways 107 from the periphery 110 of the ferrule retainer 105 to all the periphery ferrule retainer openings 106a. As mentioned above, such accessways are needed to slide the ferrule assembly fibers into the openings 106 from the side. (If the distal ends of the fibers are terminated or the fibers are long, it would otherwise be difficult or impossible to thread the fibers through the openings 106.)

Unlike a conventional ferrule retainer, the ferrule retainer 105 in one embodiment also defines an interior ferrule retainer opening 106b. In one embodiment, the interior ferrule retainer opening has no accessway when the ferrule retainer is in its assembled state. In other words, each of the ferrule retainer openings has an accessway leading to the periphery ferrule retainer opening 106a, however, there is no such accessway leading to the interior ferrule retainer opening 106b.

Referring to FIGS. 1 and 3, in one embodiment, when the ferrule retainer 105 is separated into its components 105a and 105b, an accessway 107a to the interior ferrule retainer opening 106b is made available. In other words, splitting the ferrule retainer into two or more components defines new peripheries 110a, 110b such that an opening which was an interior ferrule retainer opening with respect to the periphery 110 of the assembled ferrule retainer, becomes a periphery opening with respect to the peripheries 110a/110b of the components. An accessway from peripheries 110a/110b of the components to this periphery opening is readily configured in the components. Therefore, an important feature of the ferrule retainer is that in its unassembled state, every ferrule retainer opening, or portion thereof, is along the periphery of the ferrule retainer components such that access to the opening from the periphery is available.

In another embodiment, the ferrule retainer components when assembled do not define an interior ferrule retainer opening, even though such an opening is defined in the housing. This is achieved by the ferrule retainer components defining a channel, crack or similar space between them in their assembled state. The channel or similar structure provides access to ferrule retainer openings corresponding to interior openings in the housing. Still other embodiments will be obvious to those of skill in the art in light of this disclosure.

The way in which the ferrule retainer components separate to facilitate access to the interior ferrule retainer opening(s) can vary. For example, in the embodiment shown in FIG. 3, access to the interior opening 106b is achieved by having the ferrule retainer components 105a, 105b separate along the interior opening 106b such that each ferrule retainer component defines a portion of the interior opening 106b. Alternatively, rather than splitting the ferrule retainer 105 at the opening, the ferrule retainer components could be separated such that the interior opening remains intact in one of the ferrule retainer components. In such an embodiment, access can be provided to the interior opening via an accessway similar to those depicted for the periphery openings 106a.

Furthermore, it should be understood that although just one interior opening is shown in the ferrule retainer 105, alternatives exist, including, for example, multiple interior openings, access to which is achieved when the ferrule retainer is separated into its different components or by virtue of a space defined between the assembled retainer components as discussed above. For example, in one embodiment, the assembled retainer defines two or more interior openings.

Although two components are shown in the embodiment of FIG. 1, it should be understood that the ferrule retainer 105 may comprise three or more components. Indeed, if the number of the interior openings is an array of interior openings such that splitting the ferrule retainer in two still leaves some ferrule retainer openings in the interior of a ferrule retainer component, then the ferrule retainer may need to be split into additional components, such that each opening is along the periphery of the ferrule retainer component. For example, Applicants have determined that once the number of interior openings exceeds a 3×3 matrix, it is likely that a third ferrule retainer component may be required to ensure that each of the interior openings in the ferrule retainer is along the periphery of one of its components.

In the disclosed embodiment, the components 105a and 105b shown in FIG. 3 are hermaphroditic, meaning they are essentially the same part and they are configured to cooperate with each other to form the ferrule retainer in its assembled state. As shown in FIG. 3, the ferrule retainer components 105a, 105b are the same part. In the assembled state, the components are arranged with respect to each other such that the counterbore 301a and locating boss 301b interconnect and counterbore 302a and locating boss 302b interconnect to fit the two components together. Such an embodiment has certain advantages, including for example, reducing inventory requirements and minimizing assembly errors. Although identical hermaphroditic ferrule retainer portions are shown in FIG. 3, it should be understood that the ferrule retainer portions need not be identical and/or symmetrical and that one ferrule retainer may define more ferrule retainer openings than the other. Captive screws 111a & 111b are installed in the housing 101. The captive screws are used to install the ferrule retainer components 105a & 105b to the housing. The captive screws secure and stabilize the two ferrule retainer components to each other.

Figure 4:
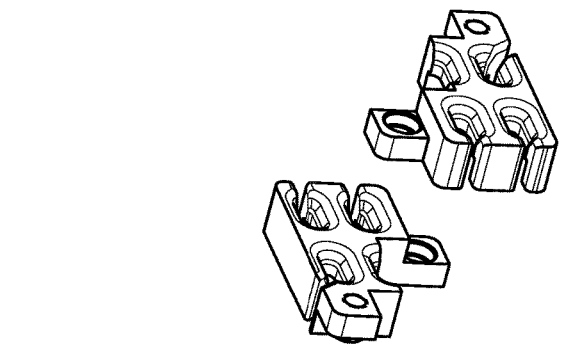
FIG. 4 shows an alternative embodiment of the connector of FIG. 1 in which the ferrule assemblies are biased with springs.
Figure 4:
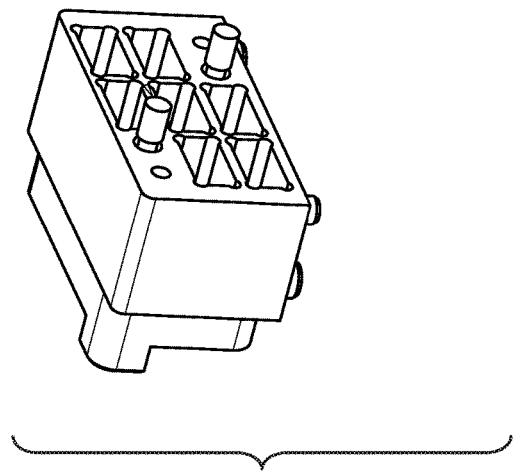

FIG. 4 shows an alternative embodiment in which the ferrules are biased forward with the spring 401. Such biasing is known and is typically found on the plug side of the connector. However, a biasing spring may be included instead on the receptacle side or on both the plug and receptacle sides.

Figure 5:
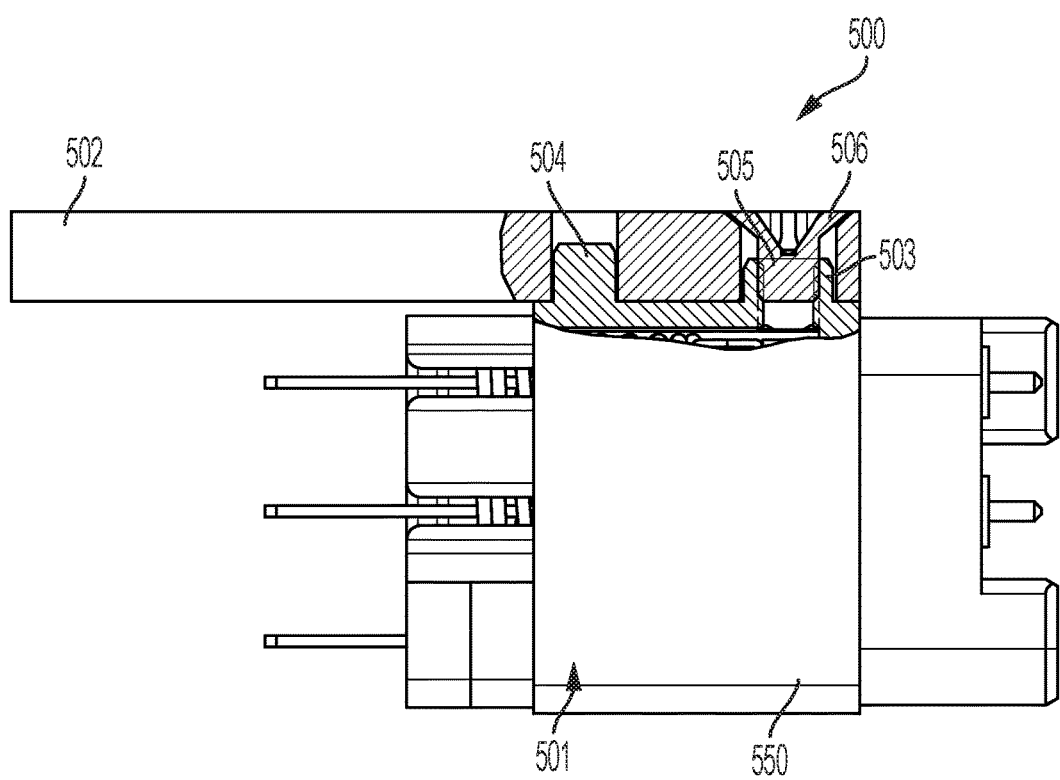
FIG. 5 shows one embodiment of a mounting configuration for securing the connector to a circuit board.

Referring to FIG. 5, one embodiment of a mounting configuration 500 for securing the connector 501 to a circuit board 502 is shown. In this particular embodiment, the housing 550 comprises a first locating post 503 and a second locating post 504. At least the first locating post defines internal threads 505 such that the first and second locating posts function to locate the housing 550 relative to a circuit board and the internal threads function to receive a fastener 506 and secure the housing to the circuit board. This embodiment utilizing the threaded locating post offers advantages. For example, depending on the circuit board thickness, the fastener securing the connector to the circuit board does not protrude into otherwise utilized space within the connector housing. Also the fastener may be fully contained within the circuit board.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A connector comprising:
a housing defining a plurality of ferrule housing openings configured to receive ferrules, at least one of said ferrule housing openings being an interior ferrule hosing opening; and
a combination of at least two retainer components, said combination of said at least two retainer components defining a plurality of ferrule retainer openings, at least one of said plurality of ferrule retainer opening being an interior ferrule retainer opening, wherein said interior ferrule retainer opening aligns with said interior ferrule housing opening, each of said at least two retainer components defining a periphery and a portion of said plurality of ferrule retainer openings, wherein at least one of said at least two retainer components has an accessway from said periphery to at least a portion of said interior ferrule retainer opening.

2. The connector of claim 1, wherein said portion of said ferrule retainer openings comprises more than one ferrule retainer opening.

3. The connector of claim 2, wherein each of said plurality of ferrule retainer openings or part thereof is defined along the periphery of one of said at least two ferrule retainer components.

4. The connector of claim 1, wherein said at least one interior ferrule retainer opening is located in a matrix of ferrule retainer openings comprising rows and columns and said at least one interior ferrule retainer opening is between two columns and between two rows of said matrix.

5. The connector of claim 1, wherein said each of said at least two ferrule retainer components defines part of said interior ferrule retainer opening such that said combination of said at least two ferrule retainer components defines completely said interior ferrule retainer opening.

6. The connector of claim 5, wherein each of said plurality of ferrule retainer openings or part thereof is defined along the periphery of one of said at least two ferrule retainer components.

7. The connector of claim 1, wherein said at least two ferrule retainer components comprises two ferrule retainer components.

8. The connector of claim 7, wherein said two ferrule retainer components are hermaphroditic.

9. The connector of claim 8, wherein said two ferrule retainer components are interconnected.

10. The connector of claim 9, wherein said two ferrule retainer components are connected to and aligned with said housing with one or more fasteners.

11. The connector of claim 1, wherein each of said at least two ferrule retainer components defines alignment mounting holes for receiving mounting fasteners.

12. The connector of claim 1, wherein said housing comprises a first locating post and a second locating post, at least said first locating post defining internal threads such that the said first and second locating posts function to locate the housing relative to a circuit board and said internal threads function to receive one or more fasteners to secure said housing to said circuit board.

13. The connector of claim 1, further comprising a plurality of ferrules, and an optical cable terminated to each ferrule, wherein each of said plurality of ferrules is disposed in one of said plurality of ferrule housing openings in said housing and said optical cable of each ferrule is disposed in one of said plurality of ferrule retainer openings aligned with said one of said plurality of ferrule housing openings.

14. A connector kit comprising:
a housing defining a plurality of openings for receiving an interface portion of one or more conductors; and
combination of at least two retainer components defining a plurality of ferrule retainer openings, at least one said plurality of ferrule retainer openings being an interior ferrule retainer opening, and being configured to be combined with said housing such that said interior ferrule retainer opening aligns with said interior ferrule housing opening, each of said at least two retainer components defining a periphery and a portion of said plurality of ferrule retainer openings, wherein at least one of said at least two retainer components has an accessway from said periphery to at least a portion of said interior ferrule retainer opening.

15. The connector kit of claim 14, wherein said at least two retainer components comprises two retainer components, and said two retainer components are hermaphroditic.

* * * * *